(12) United States Patent
Dolzer et al.

(10) Patent No.: US 8,770,231 B2
(45) Date of Patent: Jul. 8, 2014

(54) PIPE ELEMENT WITH A TRIMMED EDGE FOR WELDING ONTO A CARRIER

(75) Inventors: Heimo Dolzer, Buerserberg (AT); Ephraim Arzt, Nenzing (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 676 days.

(21) Appl. No.: 12/981,259

(22) Filed: Dec. 29, 2010

(65) Prior Publication Data

US 2011/0155712 A1    Jun. 30, 2011

(30) Foreign Application Priority Data

Dec. 31, 2009    (DE) .................. 10 2009 060 795

(51) Int. Cl.
*F16L 11/00*    (2006.01)

(52) U.S. Cl.
USPC ............ 138/109; 138/155; 228/175; 219/107

(58) Field of Classification Search
USPC .................... 138/109, 155; 228/175; 219/107
See application file for complete search history.

(56) References Cited

U.S. PATENT DOCUMENTS

| | | | |
|---|---|---|---|
| 3,062,567 A | 11/1962 | De Witt | |
| 3,860,265 A * | 1/1975 | Weiss | ............ 280/281.1 |
| 4,097,716 A | 6/1978 | Reichelt, Jr. et al. | |
| 4,274,621 A | 6/1981 | Illakowicz et al. | |
| 5,159,175 A | 10/1992 | Loeber | |
| 5,190,207 A | 3/1993 | Peck et al. | |
| 5,423,564 A * | 6/1995 | Harvey | ............ 280/281.1 |

FOREIGN PATENT DOCUMENTS

| | | |
|---|---|---|
| DE | 3032357 C1 | 4/1982 |
| DE | 10306863 B3 | 7/2004 |
| EP | 0048403 A2 | 3/1982 |
| EP | 0870572 A1 | 10/1998 |
| FR | 2684916 A1 | 6/1993 |
| GB | 527107 | 10/1940 |
| GB | 2210309 A | 6/1989 |
| JP | 49055544 A | 5/1974 |
| JP | 5449938 A | 4/1979 |
| JP | 59127980 A | 7/1984 |
| JP | 60152367 A | 8/1985 |
| JP | 60216977 A | 10/1985 |
| JP | 11239890 A | 9/1999 |

OTHER PUBLICATIONS

ISA European Patent Office, Extended European Search Report of EP10015628, Jul. 11, 2012, Germany, 16 pages.

* cited by examiner

*Primary Examiner* — Patrick F Brinson
(74) *Attorney, Agent, or Firm* — Alleman Hall McCoy Russell & Tuttle LLP (57) ABSTRACT

The present disclosure relates to a pipe element with a trimmed edge for welding onto a carrier, wherein the trimmed edge is cut from a base tube so that the pipe element can be arranged on the surface of the carrier and welded to it along the trimmed edge, wherein the trimmed edge has a first cam with which the pipe element can be placed on the surface of the carrier. It is further provided that the trimmed edge has at least one second cam with which it can be placed on the surface of the pipe element, so that an air gap remains between the surface of the carrier and the trimmed edge in a region lying between the first cam and the second cam.

4 Claims, 5 Drawing Sheets

Fig. 2

PIPE ELEMENT WITH A TRIMMED EDGE FOR WELDING ONTO A CARRIER

CROSS REFERENCE TO RELATED APPLICATION

This application claims priority to German Patent Application No. 10 2009 060 795.1, entitled "Pipe Element with a Trimmed Edge for Welding onto a Carrier", filed Dec. 31, 2009, which is hereby incorporated by reference in its entirety for all purposes.

BACKGROUND AND SUMMARY

The present disclosure relates to a pipe element with a trimmed edge for welding onto a carrier, wherein the trimmed edge is cut from a base tube so that the pipe element can be arranged on the surface of the carrier and welded to it along the trimmed edge.

TECHNICAL FIELD

Formation of a trimmed edge by cutting from a base tube has significant advantages compared to other procedures for fabricating a welded joint region such as, for example, shaping of the pipe end by stamping, particularly with respect to process control and the joint quality that can be attained.

Here the trimmed edge is generally cut from the base tube so that the pipe element lies circumferentially along the trimmed edge on the surface of the carrier. However, this can result in problems with respect to process reliability of a full penetration weld. In order to improve the full penetration weld, the trimmed edge can be beveled so that it lies only on its inner side in a ring shaped path on the surface of the carrier and results in a welding region having a triangular cross section. However, an optimal full penetration weld also cannot be achieved with such a pipe element, especially with an automated welding procedure.

A further improvement for full penetration welding is known to consist of a cam provided on the trimmed edge with which the pipe element is placed on the surface of the carrier, while an air gap remains between the surface of the carrier and the trimmed edge in the remaining region. The cam is arranged in the region of the trimmed edge in which the surface of the pipe element makes such a narrow angle with the surface of the carrier that only a fillet weld can be implemented in any case.

Using this technique, however, the pipe element must be positioned on the carrier with the most exacting precision with respect to the setting angle, and must be held in this position during the welding process to achieve good weld results. This gives rise to serious quality problems, especially with an automated welding process.

The object of the present disclosure is thus to further develop the known technique and the pipe elements used so that the reliability of the process is improved during welding.

This objective is achieved according to the present disclosure by a pipe element with a trimmed edge for welding onto a carrier, wherein the trimmed edge is cut from a base tube so that the pipe element can be arranged on the surface of the carrier and welded to it along the trimmed edge, wherein the trimmed edge has a first cam with which the pipe element can be placed on the surface of the carrier, and wherein the trimmed edge has at least one second cam with which it can be placed on the surface of the pipe element, so that an air gap remains between the surface of the carrier and the trimmed edge in a region lying between the first cam and the second cam.

Various advantageous embodiments of the present disclosure are described herein. In addition, the present disclosure comprises a set made of a pipe element according to the present disclosure and a carrier, a component that comprises a pipe element and a carrier, a construction machine or material handling machine with a suitable component, a machine for automatically cutting a trimmed edge according to the present disclosure, and a process for fabricating a pipe element according to the present disclosure, as well as for welding such a pipe element.

The pipe element according to the present disclosure thereby has a trimmed edge to be welded to a carrier, which is trimmed from a base tube in such a manner that the pipe element is arranged on the surface of the carrier and can be welded to it along the trimmed edge. The trimmed edge thereby has at least a first and a second cam with which it is placed on the surface of the pipe element. In this manner an air gap remains in a region located between the first cam and the second cam between the surface of the carrier and the trimmed edge.

In the prior art, the size of the air gap must be set so that the pipe element is held in a well-defined angle on the carrier during the welding process. In contrast, by using at least two cams, the pipe element already assumes a well-defined angle with respect to the carrier that depends on the shape of the trimmed edge when it is placed on the carrier.

In the present disclosure the cams thereby respectively form projections with respect to an imaginary trimmed edge, which would correspond to a circumferential line of contact between the pipe element and the surface of the carrier, so that an air gap remains between the surface of the carrier and the trimmed edge between the cams.

By using a trimmed edge having at least two cams with which the pipe element can be placed on the surface of the carrier, there is a possibility of a reliable process for preparing an air gap in the region between the cams. In this manner superior weld results can be achieved, in particular even with automated welding techniques. Full penetration welding can be achieved advantageously in the region of the air gap.

The pipe element according to the present disclosure is thereby cut from a base tube that has a uniform, closed profile along its longitudinal axis. The pipe element is advantageously shaped as a hollow cylinder. In particular, the base tube or pipe element is preferentially a steel pipe.

The carrier advantageously also has a tubular shape, and thus a uniform, closed profile. The present disclosure can thereby be used with carriers having different surface shapes. It is especially advantageous if the present disclosure makes use of a carrier whose surface is likewise cylindrical. In particular, a steel pipe is also advantageously used for the carrier.

Furthermore, the present disclosure can be used in particular when the diameter of the pipe element is smaller than the diameter of the carrier.

The height of the air gap is advantageously determined by the trimmed edge placed on the surface of the carrier only by the shape of the trimmed edge and the surface of the carrier, so that a well-defined air gap is produced by the cams. This can be achieved over an appropriate length of at least one of the cams and/or the use of at least three cams, since a unique orientation of the pipe element is defined by three suitably arranged points of support. In particular, three or more points of support should thus be arranged over an angular region of more than 180°. Furthermore, each of the contiguous air gaps should extend over an angular range smaller than 180°, and advantageously smaller than 150°, and more advantageously smaller than 130°.

More advantageously, it can be provided that the trimmed edge has a third cam with which it can be placed on the surface of the pipe element. The reliability of the process can be further increased by use of a third cam, since the position of the pipe element is determined with respect to the carrier by three points of support. According to the present disclosure, a well-defined air gap is thus established between the surface of the carrier and the trimmed edge in the regions located between the cams. The trimmed edge advantageously has exactly three cams.

The center axis of the pipe element thereby advantageously makes an acute angle with respect to the center axis of the carrier. The present disclosure is thereby advantageously used with connections in which the angle between the two center axes is smaller than 85°, and more advantageously less than 80°. The two center axes can thereby intersect.

Furthermore, it is advantageously provided that the pipe element according to the present disclosure has a trimmed edge according to the present disclosure respectively on both of its ends, so that it can be welded between two carriers. In particular the pipe element can consist of a diagonal pipe that connects two parallel carriers.

Furthermore, it is also advantageous if the first cam is located in a region in which the surface of the pipe element encloses an acute angle with the surface of the carrier. In any case, in this region only a fillet weld can normally be made since a full penetration weld is not possible due to of the acute angle. The quality of the connection in this region thus does not suffer because of the first cam.

Furthermore, it is advantageous to provide that, in a second region in which the surface of the pipe element makes an obtuse angle with the surface of the carrier, an air gap remains between the surface of the carrier and the trimmed edge. A good full penetration weld through the air gap is possible in this region. The second region with the air gap of the first cam thereby advantageously lies opposite with respect to the center axis of the pipe element.

Furthermore, the second and/or third cam are advantageously arranged in a region in which the surface of the pipe element makes an obtuse angle with the surface of the carrier. The second and/or third cam thus guarantees a well-defined air gap that can be reliably fabricated. In order for the full penetration weld to have the smallest possible influence in these regions, the second and/or third cam is thereby shorter than the first cam, at which no full penetration weld can be made in any case.

The angle between the surface of the pipe element and the surface of the carrier specified above is thereby measured in a plane in which the center axis of the pipe element passes.

By means of the present disclosure, an opening between the inside of the pipe element and the outside remains for the pipe element placed on the carrier in the region of the air gap, which is bounded by the trimmed edge and the surface of the carrier. The height of the air gap is thereby defined as the smallest height of this opening observed above the thickness of the walls of the pipe element measured in the direction normal to the surface of the carrier.

The air gap advantageously has an essentially constant height over its entire length. This can be achieved in particular if the shape of the trimmed edge in the region of the air gap corresponds essentially to an imaginary line of intersection between the pipe element and the surface of the carrier. It can be provided in particular that the inner edge of the trimmed edge corresponds to an imaginary line of intersection between the inner side of the pipe element and the surface of the carrier in the region of the air gap.

It is furthermore advantageous if the air gap has a height between 1 mm and 3 mm, and advantageously about 2 mm, over its length. The best results for the welding process are thereby achieved in this manner.

There are obviously transition zones between the air gap region and the cam region. In these zones the height of the air gap passes from its desired size to zero. The total length of these transition zones is advantageously less than 30% of the total air gap length, more advantageously less than 10%, and more advantageously less than 5%.

Furthermore, the trimmed edge of the air gap is beveled outwardly in the region of the air gap. The space between the trimmed edge and the surface of the carrier is thus enlarged from the inner side of the wall of the pipe element to the outer side. The weld quality can also be improved in this manner.

Furthermore, the midpoints of the cams advantageously lie at least 60° from one another, advantageously at least 90°, and more advantageously 120°. In this manner a process with highly reliable placement of the pipe element on the surface of the carrier is attained.

Furthermore, the contact line of the trimmed edge with the surface of the carrier in the region of the first cam has a length between 20° and 100°, more advantageously between 40° and 80°, and more advantageously approximately 60°. This is especially significant when the first cam lies in a region in which the surface of the pipe element makes an acute angle with the surface of the carrier. In any case, only one fillet weld is possible, so that a larger bearing surface is achieved by the extension of the length of the first cam without reducing the quality of the weld.

The trimmed edge advantageously lies flat on the surface of the carrier in the region of the first cam. Good support is provided in this manner.

Furthermore, it is advantageous if the contact line of the trimmed edge with the surface of the carrier in the region of the second and/or third cams is shorter than it is in the first region, wherein the length in the region of the second or third cam is more advantageously less than 20% of the length in the first region, and more advantageously less than 10%.

Furthermore, it is advantageous if the contact line of the trimmed edge with the surface of the carrier in the region of the second and/or third cams is less than 20%, and more advantageously less than 10%. It is thereby advantageous if the contact in the region of the second and/or third cams is essentially point shaped. This is particularly advantageous if the second and/or third cams are located in a region in which welding of the trimmed surface with the surface of the carrier is possible. Thus, the cams in this region should be made as short as possible.

It is furthermore advantageous if the entire line of contact of the trimmed edge with the surface of the carrier has a length of less than 120°, more advantageously less than 100°, and more advantageously less than 80°. This would assure that a good full penetration weld is achieved in the largest possible region.

The abovementioned angles are thereby defined as the angle between two planes that intersect in the center axis of the pipe element and pass through the respective points.

The present disclosure furthermore comprises a set made of a pipe element, as described above, and a carrier. Such a set enables a particularly reliable weld to be produced. In such a case it is advantageous that the carrier be pipe shaped as well. The set furthermore advantageously comprises two carriers that can be connected by means of the pipe element.

The present disclosure furthermore comprises a component by which a pipe element according to the present disclosure was welded to a carrier along the trimmed edge. In particular, the component relates to a lattice piece according to the present disclosure. The carrier thereby advantageously forms a longitudinal brace, while the pipe element forms a diagonal brace. At least two longitudinal braces are preferentially provided, between which a plurality of pipe elements are welded in as diagonal braces.

The present disclosure furthermore comprises a construction machine or a material handling machine, in particular a crane, having a component according to the present disclosure. In particular, the component relates to a lattice piece of a boom of the construction machine or material handling machine. In particular, the boom is thereby assembled from a plurality of lattice pieces according to the present disclosure.

The present disclosure furthermore comprises a machine for automatically cutting a trimmed edge of a pipe element, as described above, from a base tube. In particular, the machine thereby comprises a controller that is programmed so that a trimmed edge according to the present disclosure can be automatically fabricated.

The machine thereby advantageously has a mechanism by which a cutting tool can be guided on the base tube along the desired trimmed edge. The relative motion between the base tube and the cutting tool can thereby result from a motion of the base tube and/or a motion of the cutting tool. The machine thereby advantageously has a rotating mechanism for rotating the base tube about its center axis. Furthermore, the machine advantageously has a cutting tool, which can be moved in the longitudinal direction of the pipe so that a trimmed edge according to the invention can be produced. The cutting tool is thereby advantageously also pivotable so that it can produce a bevel on the cutting edge. The cutting tool can advantageously be a welding torch.

The present disclosure furthermore comprises a procedure for fabricating a pipe element as has been described above. According to the present disclosure, a cutting tool is thereby guided on a base tube along the desired trimmed edge in order to form the edge. The guiding of the cutting tool along the trimmed edge can thereby occur by a motion of the base tube and/or by a motion of the cutting tool. The base tube is thereby preferentially rotated about its center axis while the cutting tool is moved in the longitudinal direction of the base tube in order to produce the desired shape of the trimmed edge. The cutting tool is thereby advantageously also swiveled in order to produce a desired bevel of the trimmed edge.

The trimmed edge is thereby advantageously produced automatically by suitable drives of a machine by being controlled through a suitably programmed controller.

The present disclosure furthermore comprises a procedure for fabricating a component, especially a lattice piece, through welding of a pipe element according to the present disclosure with a carrier. The procedure thereby comprises placing of the pipe element on the surface of the carrier so that the trimmed edge with the cams lies on the surface, and that welding of pipe elements and carrier occurs along the trimmed edge. By using the at least two cams of the trimmed edge, a well-defined air gap can be obtained in a reliable manner between the trimmed edge and the surface of the carrier by placing the pipe elements, whereby a qualitatively high value weld of pipe element and carrier is achieved.

A welding tool is thereby advantageously guided along the trimmed edge in order to produce the weld. The welding process is advantageously performed automatically. This occurs in particular by the drive for a welding machine being controlled by an appropriately programmed controller.

A fillet weld is thereby advantageously formed between the surfaces of the pipe element and carrier in the region of the first cam. A fillet weld is provided in particular when the surface of the pipe element makes such a sharp angle with the surface of the carrier in the region of the first cam that forming a full penetration weld is not possible.

Furthermore, a weld of the trimmed edge with the surface of the carrier is advantageously formed in the region of the air gap. In particular, the complete trimmed edge is hereby welded with the surface of the carrier. An especially stable connection is achieved by such means in the region of the air gap.

The fillet weld is thereby advantageously made at the start. This is then advantageously followed by making the weld in the remaining regions of the trimmed edge.

Furthermore, the welding process thereby advantageously takes place along the trimmed edge from one end of the first cam along the air gap through the second and, if necessary, third cam up to the other end of the first cam. A welding tool is thereby advantageously moved along this line.

The method for fabricating the component thereby advantageously comprises the preparation of a pipe element according to the present disclosure, in particular the step of fabricating such a pipe element according to the procedure described above.

The present disclosure will now be described in more detail with the aid of an embodiment and drawings as follows.

DETAILED DESCRIPTION

Figure 1:
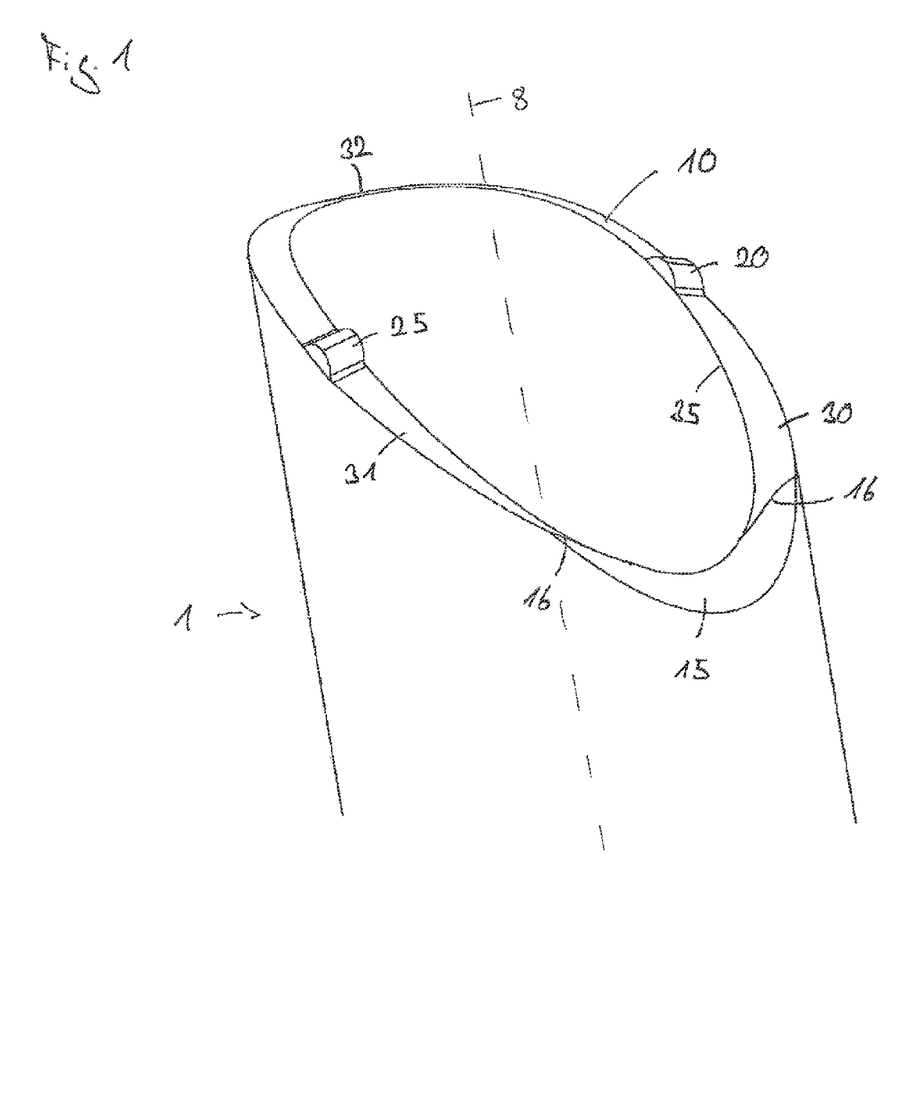
FIG. 1 is a perspective view of an embodiment of a pipe element having a trimmed edge according to the present disclosure.

FIG. 1 shows an embodiment of a pipe element according to the present disclosure in which the pipe element has the shape of a hollow cylinder. In the embodiment this consists of a steel pipe.

Figure 2:
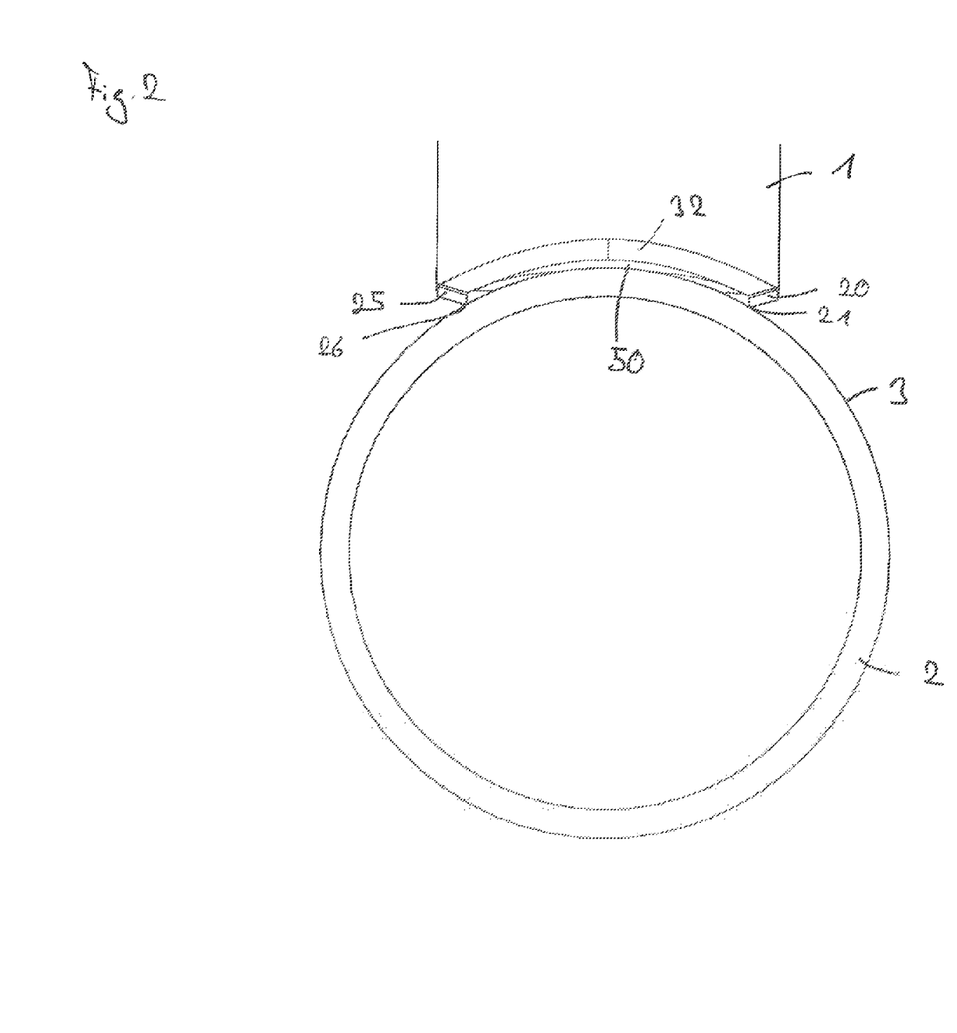
FIG. 2 is a front view of the pipe element placed on a carrier according to the present disclosure.
Figure 3:
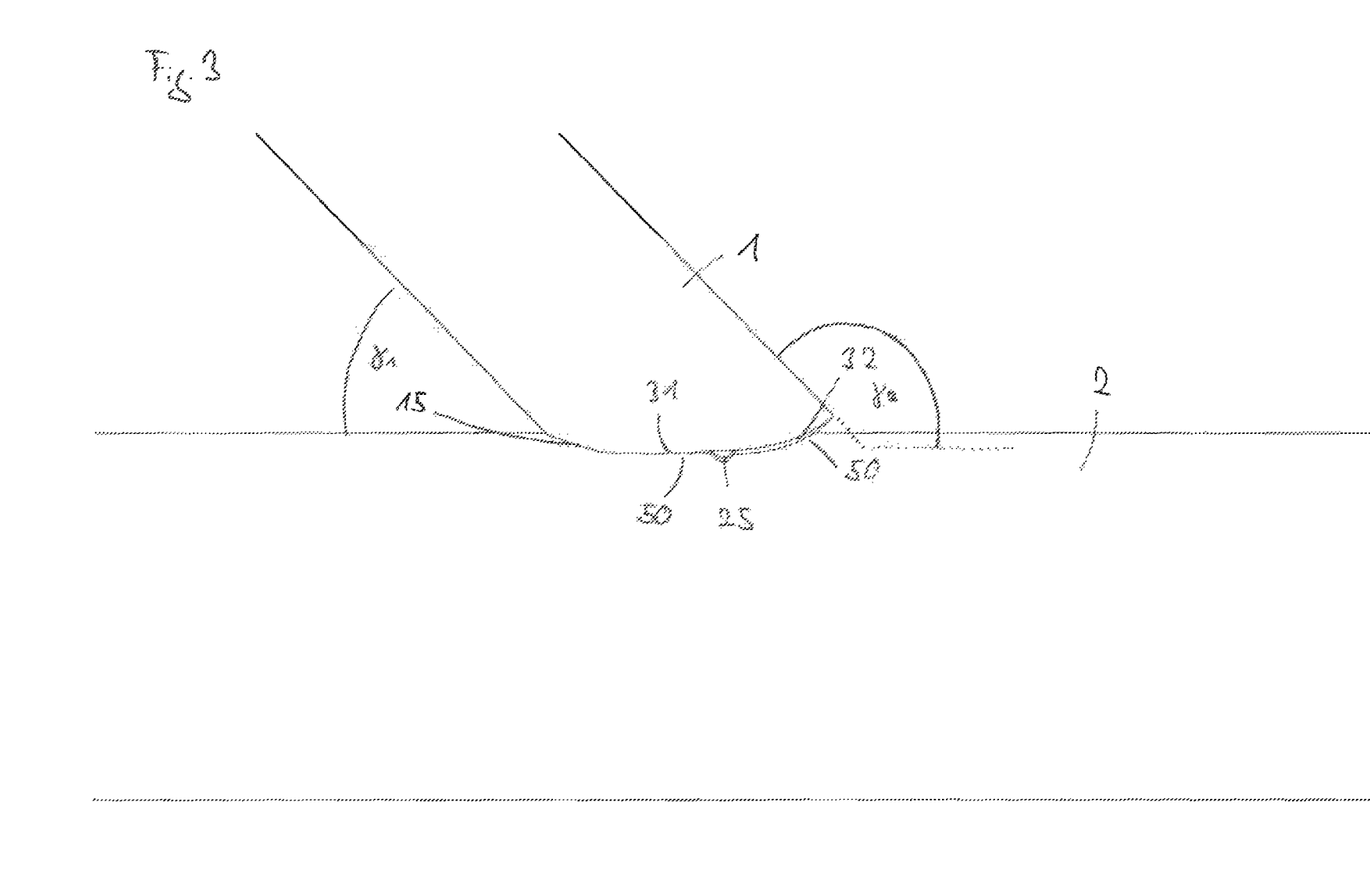
FIG. 3 is a side view of the situation shown in FIG. 2.

The pipe element 1 has a trimmed edge, which is produced by cutting the pipe element out of a base tube. As is shown in FIGS. 2 and 3, the pipe element 1 can be arranged on the surface 3 of a carrier 2 by means of the shape of the trimmed edge, and welded with it along the trimmed edge. The carrier in this embodiment is also a pipe. In particular, it can also be a steel pipe. The diameter of the carrier is thereby larger than the diameter of the pipe element.

According to the present disclosure, cams 15, 20, and 25 are provided on the trimmed edge of the pipe element by which the pipe element can be placed on the surface of the carrier 2. The orientation of the pipe element on the surface of the carrier 2 is uniquely determined by the cams. This results in a well-defined air gap 50 in the regions between the cams, which enables the reliable formation of a full penetration weld.

The pipe element thereby has a first cam 15, which is located in a region in which the surface of the pipe element 1 makes an acute angle with the surface of the carrier. This angle is indicated as $\gamma_1$ in FIG. 3. The angle between the surfaces is thereby measured in a plane through which the center axis 8 of the pipe element 1 passes. The angle is then determined in this plane between the surface of the pipe element and the surface of the carrier.

The smallest angle $\gamma$ between the two surfaces thereby corresponds to the angle between the center axis of the pipe element and the carrier. This angle is thereby advantageously smaller than 85°, and more advantageously smaller than 80°.

In contrast, the surface of the pipe element makes an obtuse angle $\gamma_2$ with the surface of the carrier in the region lying opposite the first cam. An air gap 50 is shown in the embodiment which enables full penetration welding.

Figure 4:
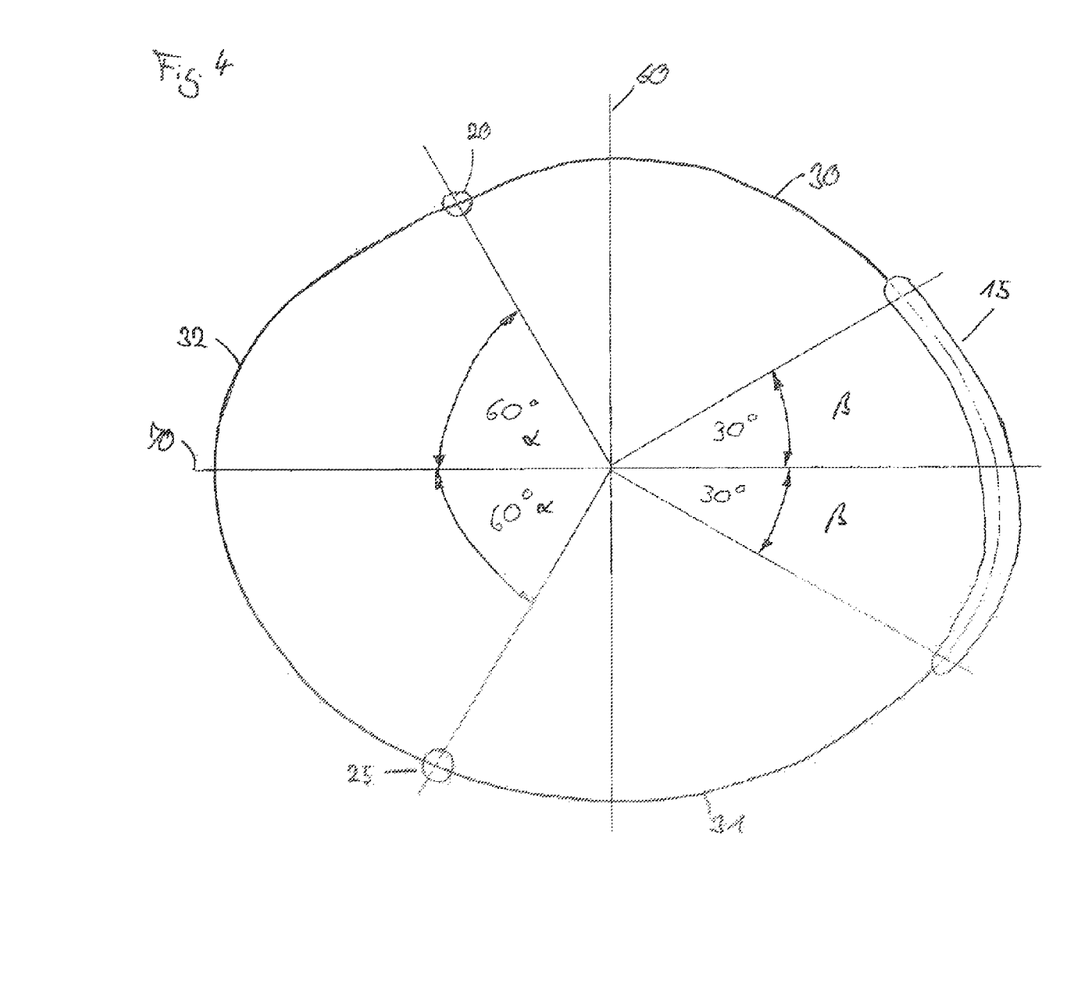
FIG. 4 is a schematic diagram showing the segmentation of a trimmed edge according to the present disclosure.

As is also evident from FIG. 4, the first cam 15 extends over a relatively large region of about 60°. In this region the trimmed edge is formed so that it lies two-dimensionally on the surface of the carrier 2. A fillet weld is made between the surface of the pipe element 1 and the carrier 2 for welding in this region.

Regions 30 and 31, in which an air gap 50 is provided, are connected to both sides at the first cam 15. The second cam 20 is thereby connected to region 30, and the third cam 25 to region 31. A region 32 is provided between the second cam 20 and the third cam 25 in which an air gap 50 is also provided. The air gap thereby has an essentially constant height of about 2 mm over its entire length. The trimmed edge is thereby beveled outwardly in the region of the air gap, so that the distance between the carrier and the trimmed edge becomes larger toward the outside. The height of the air gap thus results from the distance between the surface of the carrier and the inner side of the trimmed edge. In the air gap regions the inner side of the trimmed edge is a curve, which would form a circumferential contact line with the surface of the carrier in the absence of the cams.

The arrangement of the three cams 15, 20, and 25 and the three regions 30, 31, and 32 in which the air gap is located is again shown schematically in FIG. 4. The wall thickness of the pipe component is not shown in this schematic drawing. However, this thickness is the same in any case in all these regions.

FIG. 4 shows that the first cam 15 extends through an angular region of about 60°. The two cams 20 and 25 are arranged respectively about 120° from the midpoint of the first cam 15, so that an angle of about 120° likewise lies between the second cam 20 and the third cam 25. The angle is thereby measured with respect to the center axis of the pipe element and also the minor axis.

The axis is labeled as 60 about which the pipe element is sloped with respect to the surface of the carrier. A symmetry plane 70, also indicating the major axis, oriented perpendicular to this slope axis 60 is also drawn. The arrangement of the cams is thereby symmetrical with respect to this symmetry plane 70. In particular, the first cam 15 extends with respect to this symmetry plane 70 in one direction about the same angle $\beta$ as in the other direction. Furthermore, the second cam 20 and the third cam 25 are arranged respectively at the same angle $\alpha$ with respect to the symmetry plane 70.

Unlike the case for the first cam 15, in which a relatively larger contact region with the surface of the carrier 2 is present, the two cams 20 and 25 are relatively small, so that a smaller, essentially point shaped contact results. As shown in FIG. 2, the trimmed edge is sloped upwards, even in the region of the cams 20 and 25, with respect to the surface 3 of the carrier, so that the contact takes place on the inner side of the trimmed edge. In this way the two cams 20 and 25 hinder the full penetration weld to the least extent possible.

As FIG. 1 also shows, the second cam 20 and the third cam 25 are respectively formed by projections on the surrounding intersecting surface. The first cam 15 is likewise formed by a longitudinally extended projection, which can however only be seen clearly at the transition regions 16, by simultaneously changing the bevel of the plane of intersection. As an alternative to the embodiment shown in FIG. 1, a flowing transition could also be provided between the regions with cams and the air gap regions. However, the transition region in which the air gap is smaller than its optimal size of about 2 mm would be larger for a flowing transition.

The trimmed edge according to the present disclosure is advantageously fabricated by cutting a base tube along the trimmed edge in a cutting machine. The base tube is thereby advantageously rotated about its center axis while a cutting tool produces the desired trimmed edge by suitable positioning and orientation. The present disclosure thus also comprises a suitable machine for fabricating such a trimmed edge. A welding torch is thereby advantageously used as the cutting tool. A metal removing procedure can alternatively be employed to fabricate the trimmed edge.

Welding with the carrier 2 occurs by the first the pipe element being placed on the surface of the carrier 2 so that the cams come into contact with this surface. Then a fillet weld is made in the region of the first cam 15. In the remaining regions the trimmed surface itself is welded with the surface of the carrier. The cams thereby enable reliable positioning of the pipe element on the surface of the carrier. A full penetration weld can thereby be achieved by the air gap according to the present disclosure. By these means in particular, a welding robot can advantageously be employed. In this case a welding machine can be guided advantageously along the trimmed edge in order to form the weld.

The present disclosure is particularly advantageous for fabricating lattice pieces in which the diagonal braces are formed from pipe elements according to the present disclosure. They are cut to fit on both sides, and then welded between two longitudinal braces. This is particularly useful for lattice pieces used as elements of a material handling machine, especially a crane.

The present disclosure also enables a reliable process as well as high quality welding by the formation of the trimmed surface according to the present disclosure.

Figure 5:
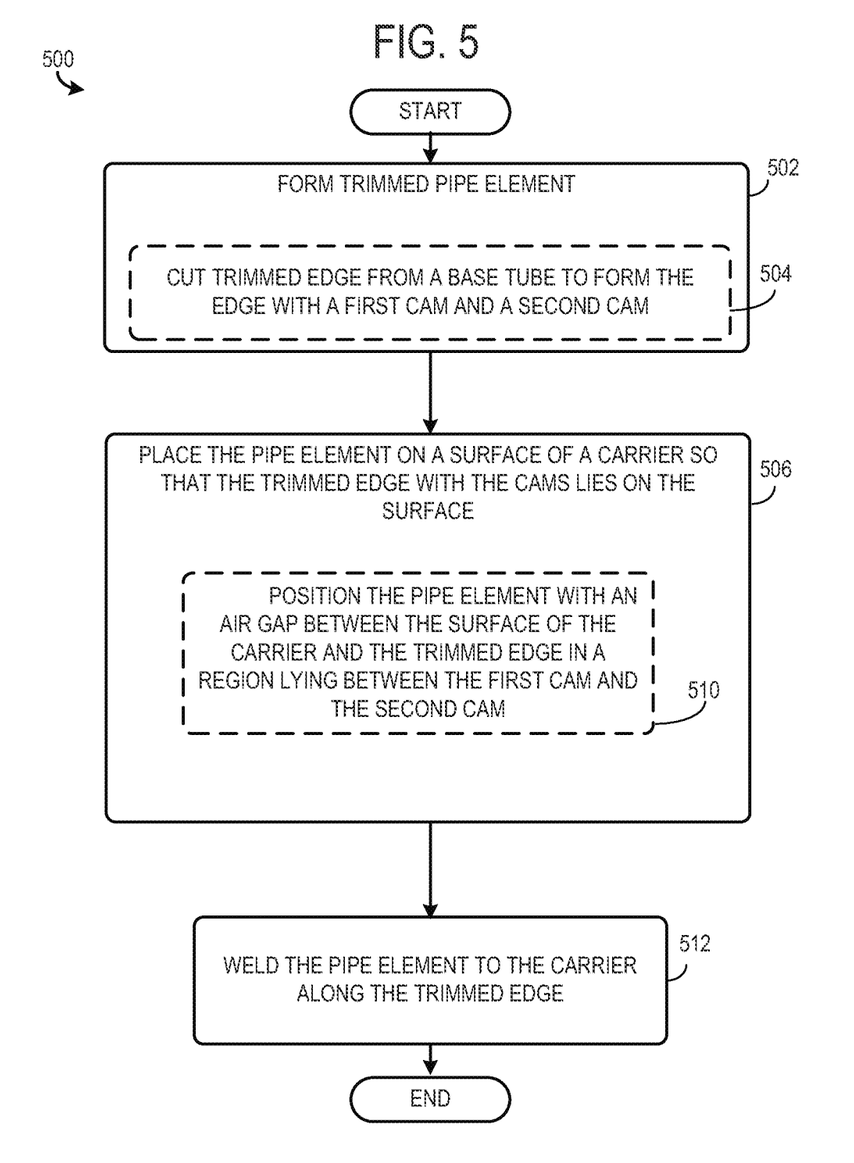
FIG. 5 shows an example method of operation.

FIG. 5 shows a high level summary of an example method 500 according to the present disclosure, as described in detail above herein. The method 500 includes at 502 forming a trimmed pipe element. At 504, the pipe element with a trimmed edge may be formed by cutting the trimmed edge from a base tube to form the edge with a first and second cam so that the pipe element can be arranged on the surface of the carrier and welded to it along the trimmed edge. Then, at 506, the method 500 may include placing the pipe element on the surface of the carrier so that the trimmed edge with the cams lies on the surface of the carrier. The method 500 may also include at 510 placing the pipe element on the surface of the carrier via the first and second cam so that an air gap remains between the surface of the carrier and the trimmed edge in a region lying between the first cam and the second cam. Next, at 512, the method 500 includes welding the pipe element and carrier along the trimmed edge. Finally, various additional features may be included in method 500 as noted above herein.

Further, as illustrated in FIGS. 1-4, an article of manufacture is described that, in one example, includes a pipe element with an oval-shaped trimmed edge formed by a plane or a tubular shape that dissects the pipe at an angle with respect to a centerline axis of the pipe element, wherein the trimmed edge includes a first cam and a second cam, the first cam positioned about a major. The first cam may be recessed and the second cam may be raised with respect to the edge, and the article may also include a third raised cam oppositely positioned with respect to the second raised cam, wherein the second and third cams are positioned closer to a minor axis than the major axis, as illustrated in FIG. 1, for example.

The invention claimed is:

1. An article of manufacture, comprising:
a pipe element with a trimmed edge that is welded onto a carrier, wherein the trimmed edge has a first cam with which the pipe element is placed on a surface of the carrier; and
wherein the trimmed edge has at least one second cam with which the pipe element is placed on a surface of the pipe element, so that an air gap remains between the surface of the carrier and the trimmed edge in a region lying between the first cam and the second cam;
wherein the trimmed edge has at least a third cam with which the pipe element is placed on the surface of the pipe element;
wherein a line of contact of the trimmed edge with the surface of the carrier in the region of the first cam has a length between 20° and 100°, and/or a line of contact of the trimmed edge with the surface of the carrier in the region of the second and/or third cams is less than 20°; and
wherein the contact in the region of the second and third cams is essentially point-shaped, and wherein the carrier is tubular in shape.

2. The article according to claim 1, wherein midpoints of the first and second cams lie at a distance of at least 60° from one another.

3. The article of claim 1, wherein the article of manufacture further comprises a lattice piece in which the pipe element is welded with the carrier along the trimmed edge, and wherein the carrier forms a longitudinal brace and the pipe element forms a diagonal brace.

4. The article of claim 3, wherein the lattice piece forms a component of a construction machine or material handling machine.

* * * * *